United States Patent Office 3,359,259
Patented Dec. 19, 1967

3,359,259
CERTAIN 1-AZIRIDINYLALKYL PHOSPHOR-AMIDE COMPOUNDS
George E. Ham, Lake Jackson, Tex., assignor to The Dow Chemical Company, Midland, Mich., a corporation of Delaware
No Drawing. Filed Nov. 13, 1963, Ser. No. 323,243
4 Claims. (Cl. 260—239)

This invention relates to new compositions of matter and to methods of preparing such compositions. More particularly, the present invention relates to novel phosphoramide compounds, to a process for the preparation of such compounds, and to coating compositions manufactured from these compounds.

Phosphorus compounds containing aziridinyl rings are known. For example, several such compounds are disclosed by Nakabayashi in U.S. Patent 3,014,902.

It is an object of the present invention to provide a new class of phosphorus compounds containing a single aziridinyl group in the molecule. A further object of the invention is to provide a process for the preparation of these novel phosphorus compounds. Still further, objects are to provide coating compositions containing the phosphorus compounds of the invention and methods of preparing such coating compositions.

The 1-aziridinylalkyl phosphoramide compounds of the invention are prepared according to the following equation by reacting an aziridinylalkylamine and a phosphorohalodiamide:

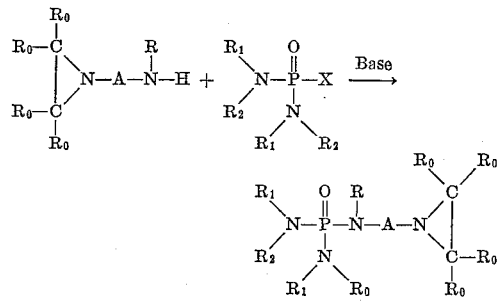

wherein each of R, $R_0$, and $R_2$ may be a hydrogen atom or a lower alkyl group of from 1 to 4 carbon atoms, each $R_1$ (which may be the same or different) is a lower alkyl group, X is a halogen atom (preferably chlorine or bromine), and A is a divalent alkylene chain of no more than 4 carbon atoms. When R, $R_0$, or $R_1$ are lower alkyl groups, each may represent a methyl, ethyl, n-propyl, i-propyl, n-butyl, i-butyl, sec-butyl, or tert-butyl group. R is preferably a hydrogen atom. Suitable —A— groups include ethylene, i-propylene, trimethylene, and tetramethylene. A preferred class of alkylene groups —A— are represented by the formula:

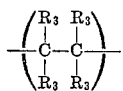

wherein each $R_3$ represents a hydrogen atom, a methyl group or an ethyl group such that the total number of carbon atoms in the divalent alkylene chain is no more than four.

These starting aziridinyl compounds can be prepared by the condensation of the appropriately substituted aziridine compounds according to the reaction:

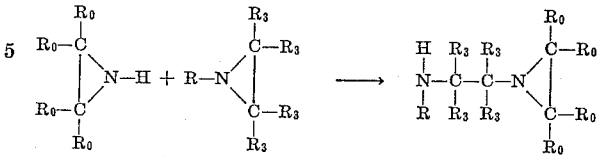

wherein each $R_0$, $R_3$, and R is as previously defined.

As used herein, the term "aziridinyl" is meant to include monovalent groups derived both from aziridine and alkyl-substituted aziridine molecules

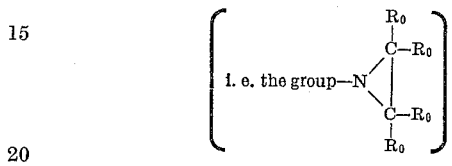

Typical preparative reactions include the following:

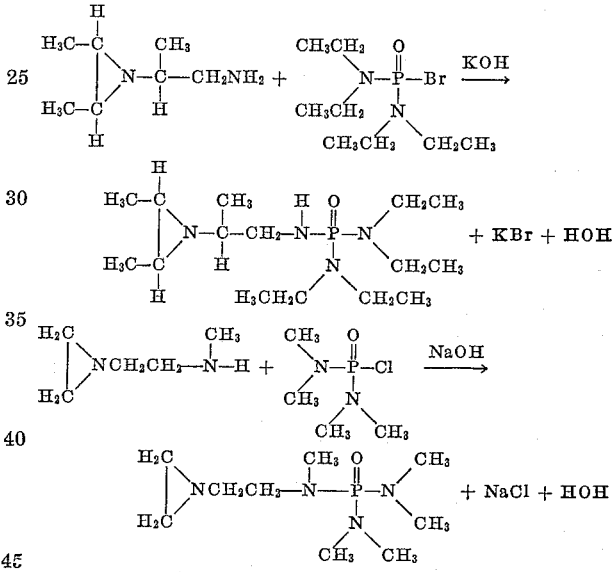

Unsymmetrical phosphorodiamidic halides (such as N'-ethyl-N,N-dimethyl-phosphorodiamidic chlorides, for example) may also be reacted with aziridinylalkylamines in the same manner.

Any convenient acid acceptor may be used in the process of the invention. Suitable basic acid acceptors include alkali metal hydroxides, oxides, carbonates, and bicarbonates (NaOH, KOH, $K_2O$, $Na_2O$, $NaHCO_3$, $Na_2CO_3$, etc.). Alkaline earth hydroxides, oxides, carbonates, and bicarbonates may also be used (CaO, $Ca(OH)_2$, $Mg(OH)_2$, $CaCO_3$, $Ca(HCO_3)_2$, etc.). Other suitable acid acceptors include ammonia and amines capable of reacting with acids.

The process may be carried out at temperatures of from about —20° C. to about 50° C. (preferably at about from —5° C. to 35° C.) using any pressure from a few hundredths of a millimeter of mercury up to several hundred atmospheres. The process is ordinarily carried out at about atmospheric pressure. Approximately equimolar amounts of reactants are employed, although this stoichiometric ratio may vary by a factor of plus or minus ten percent from the theoretical mole ratios. Sufficient acid acceptor should be present to combine with the acid released during the reaction. The use of excess (more than about 1.1 mole of phosphorus compound per mole of aziridinyl compound) phosphorus compound produces hydrolysis products which react to cause some opening of the heterocyclic (aziridinyl) groups. The use of a large excess of the aziridinyl reactant (more than about 2 moles of aziridinyl reactant per mole of phosphorus compound) does not present any particular disadvantage except that the excess reactant must be subsequently removed from the reaction mixture. The process may be carried out continuously or batch-wise, depending upon the amount to be produced.

The compounds of the invention are useful in the formation of coating compositions with styrene-maleic anhydride copolymers or other olefin-(cyclic-anhydride) copolymers (such as those formed from butadiene and a cyclic anhydride). The compounds of the invention may be added to the copolymer prior to curing and blended with the copolymer by stirring. Amounts of phosphoramide compound of up to about 75 percent by weight (based upon the total weight of the blend) may be incorporated into the copolymer. Sufficient phosphoramide compound to provide at least one aziridinyl group per cyclic anhydride group may be used. The resulting composition has excellent adhesion properties when applied to metals and is not affected by water. Furthermore, the presence of phosphorus atoms decreases the flammability of the blend. The coating is applied to metals or other materials and cured at about 90° C. to 160° C. for a time sufficient to set the coating. Time periods of from 15 minutes to 5 or 6 hours are usually sufficient. At temperatures of from 120° C. to 150° C., cure times of from 15 minutes to 30 minutes are used.

The following examples, are submitted for the purpose of illustration only and are not to be construed as limiting the scope of the invention in any way.

*Example 1*

Into a reaction vessel equipped with a means for stirring and temperature control was placed 200 milliliters of 1 Normal NaOH and 15 grams of N-(2-aminoethyl) aziridine. This mixture was cooled to 0° C. and 29.8 grams of bis-(dimethylamino)phosphorodiamidic chloride were added thereto over a 1-hour period. At the end of this time period, the temperature was raised to 25° C. and the reaction mixture was stirred for an additional hour. The mixture was then extracted with ten 100-milliliter portions of $CHCl_3$ and the $CHCl_3$ was removed under reduced pressure. There was obtained 6.25 grams of bis(N,N-dimethyl)-2-(1-aziridinyl)ethyl phosphoramide boiling at 130° to 136° C. at 0.1 mm. Hg. The product had the following properties:

$n_D^{20} = 1.4820$
Density $^{20} = 1.064$
Molar refraction (actual): 59.02
Molar refraction (calculated): 60.05

The infrared spectrum was consistent with the expected product and the structure was confirmed by nuclear magnetic resonance as bis(N,N-dimethyl)-2-(1-aziridinyl) ethyl phosphoramide:

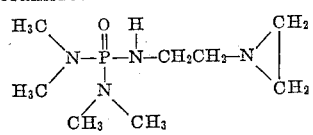

*Example 2*

A 1 gram sample of a copolymer of styrenemaleic anhydride (50 percent by weight of maleic anhydride, approximately a 1:1 mole ratio) was dissolved in 5 milliliters of methyl ethyl ketone. A second solution, consisting of 1.12 grams of the above compound of Example 1 dissolved in 5 milliliters of methyl ethyl ketone, was mixed with the first solution and the mixture was poured onto a bonderized steel panel (4 x 12 x 1/16 inches). The solvent was evaporated and a film resulted of 0.5 mils (.0005 inch) thickness. This film was cured at 140° C. for 30 minutes. The cured coating had excellent adhesion properties, was not affected by water, and had good impact strength on the surface of the film. The film softened in acetone, ethylene dichloride, and toluene.

I claim as my invention:

1. A compound of the formula:

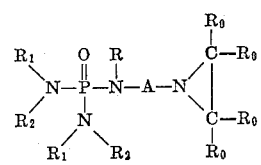

wherein:
 (a) $R_1$ is a lower alkyl group of from 1 to 4 carbon atoms,
 (b) each $R_0$, R, and $R_2$ is independently selected from the group consisting of the hydrogen atom and a lower alkyl group, and
 (c) A is an alkylene group of no more than 4 carbon atoms.

2. A compound of the formula:

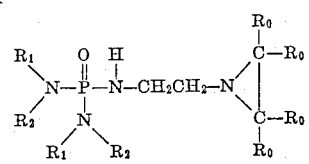

wherein:
 (a) $R_1$ is a lower alkyl group of from 1 to 4 carbon atoms, and
 (b) each $R_0$, and $R_2$ is independently selected from the group consisting of the hydrogen atom and a lower alkyl group.

3. A compound of the formula:

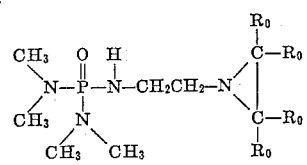

wherein $R_0$ is selected from the group consisting of the hydrogen atom and a lower alkyl group.

4. The compound:

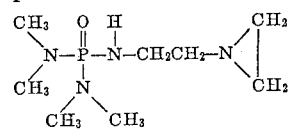

References Cited

UNITED STATES PATENTS

| | | | |
|---|---|---|---|
| 2,606,891 | 8/1952 | Rowland | 260—78.5 |
| 2,606,901 | 8/1952 | Parker et al. | 260—239 |
| 2,913,437 | 11/1959 | Johnson | 260—78.5 |
| 3,028,377 | 4/1962 | Resnick et al. | 260—239 |
| 3,146,228 | 8/1964 | Chance | 260—239 |

FOREIGN PATENTS

| | | |
|---|---|---|
| 558,874 | 6/1958 | Canada. |
| 911,764 | 11/1962 | Great Britain. |

ALTON D. ROLLINS, *Primary Examiner.*

H. R. JILES, NICHOLAS RIZZO, ALEX MAZEL, *Examiners.*